US007577617B1

(12) United States Patent
Reisinger

(10) Patent No.: US 7,577,617 B1
(45) Date of Patent: Aug. 18, 2009

(54) METHOD FOR THE DEPENDABLE TRANSMISSION OF SERVICE DATA TO A TERMINAL EQUIPMENT AND ARRANGEMENT FOR IMPLEMENTING THE METHOD

(75) Inventor: Frank Reisinger, Oranienburg (DE)

(73) Assignee: Francotyp-Postalia AG & Co. (DE)

( * ) Notice: Subject to any disclaimer, the term of this patent is extended or adjusted under 35 U.S.C. 154(b) by 1174 days.

(21) Appl. No.: 09/340,782

(22) Filed: Jun. 28, 1999

(30) Foreign Application Priority Data

Jun. 29, 1998 (DE) ................................ 198 30 055

(51) Int. Cl.
*G06F 17/00* (2006.01)
*G07B 17/02* (2006.01)

(52) U.S. Cl. ............................ 705/60; 705/61; 705/62; 705/403; 705/407; 705/410; 705/401; 705/405; 101/71; 101/91

(58) Field of Classification Search ............. 705/60–63, 705/401–410; 379/106.1–106.11
See application file for complete search history.

(56) References Cited

U.S. PATENT DOCUMENTS

| | | | | |
|---|---|---|---|---|
| 4,097,923 | A | | 6/1978 | Eckert, Jr. et al. |
| 4,138,735 | A | | 2/1979 | Allocca et al. |
| 4,752,950 | A | * | 6/1988 | Le Carpentier ........ 379/106.11 |
| 4,802,218 | A | * | 1/1989 | Wright et al. ................. 705/60 |
| 4,864,618 | A | * | 9/1989 | Wright et al. ................. 705/60 |
| 4,933,849 | A | | 6/1990 | Connell et al. |
| 5,008,827 | A | * | 4/1991 | Sansone et al. ............. 705/409 |
| 5,448,641 | A | | 9/1995 | Pintsov et al. |
| 5,490,077 | A | | 2/1996 | Freytag |
| 5,606,508 | A | | 2/1997 | Thiel |
| 5,699,415 | A | | 12/1997 | Wagner |
| 5,710,706 | A | * | 1/1998 | Markl et al. ................ 705/409 |
| 5,715,164 | A | * | 2/1998 | Liechti et al. ............... 705/410 |
| 5,778,348 | A | * | 7/1998 | Manduley et al. ........... 705/409 |
| 6,064,994 | A | * | 5/2000 | Kubatzki et al. ............ 705/410 |

FOREIGN PATENT DOCUMENTS

| | | |
|---|---|---|
| EP | 0 018 081 | 10/1980 |
| EP | 0 018 129 | 11/1982 |
| EP | 0 647 925 | 4/1995 |

* cited by examiner

*Primary Examiner*—Calvin Loyd Hewitt, II
*Assistant Examiner*—Cristina Owen Sherr
(74) *Attorney, Agent, or Firm*—Schiff Hardin LLP

(57) ABSTRACT

In a method and apparatus for dependable transmission of data from a data center to terminal equipment, particularly transmission of fee schedule table data to a postage-calculating scale or postage meter machine, new postage fee schedule table data are offered at the data center for future postage calculation. In a first communication between the data center and the terminal equipment, a request for postage fee schedule table data is formed at the terminal equipment and is communicated to the data center, and the data center receives the request and transmits the requested new service data to the terminal equipment, and the terminal equipment receives and stores the new service data. Thereafter a second communication takes place between the data center and the terminal equipment, wherein the terminal equipment forms a message referring to the stored, new service data and this message is communicated to the data center, where it is checked against information generated at the data center from the new service data. Given a positive comparison result the data center transmits a message to the terminal equipment allowing usage of the validated new service data.

32 Claims, 3 Drawing Sheets

METHOD FOR THE DEPENDABLE TRANSMISSION OF SERVICE DATA TO A TERMINAL EQUIPMENT AND ARRANGEMENT FOR IMPLEMENTING THE METHOD

BACKGROUND OF THE INVENTION

1. Field of the Invention

The present invention is directed to a method, and an arrangement for implementing the method, for dependable transmission of service data to terminal equipment from a remote location, and in particular to a method and arrangement for transmitting and storing a new postage fee table in a postage computer in a secure manner.

2. Description of the Prior Art

German PS 38 23 719 and U.S. Pat. No. 4,138,735 disclose initiating a reloading of a fee schedule table for postage fees from a remote data central at specific points in time. If the data exchange is initiated by the server of the data center, the postage meter machine must remain constantly activated, which is, of course, disadvantageous.

Alternatively, U.S. Pat. No. 5,490,077 and U.S. Pat. No. 5,606,508 disclose initiating the data loading on demand by the postage meter machine, with the data base being updated dependent on conditions (such as, for example, name, date) after the postage meter machine is turned on. In order to be able to equip a large number of postal customers with a fee schedule table in the relatively short time between the promulgation and the effective date of a new fee schedule, the new fee schedule is stored in a memory of a transmission means (chip card or cell of a GSM network) separated from the postage meter machine far before it takes effect. When the postage meter machine is turned on, the date of the calender module of the postage meter machine is employed or is combined with further input conditions in order to select the table that is loaded into the memory thereof when the postage meter machine is initialized. An updating of the previous table ensues by downloading the memory of the transmission means into of the memory of the postage meter machine.

U.S. Pat. No. 5,710,706 (corresponding to European Application 724 141) discloses a data input into a scale that is connected by an interface to a postage meter machine in order to update fee schedule table data with new data. The loading of the new data ensues by modem to the postage meter machine from a remote data center. The loading and updating ensue in immediate succession. When fee schedule table data are to be updated, a loading ensues and, given intermediate storage of fee schedule table data in the postage meter machine, a sector-by-sector deletion of the old postage table ensues in the non-volatile memory of the scale before the transmission of the new fee schedule table data from the intermediate memory of the postage meter machine to the scale and the write-in of the new fee schedule table data in the non-volatile memory of the scale. A number of tables can be stored in the scale, however, each table relates to a separate mail carrier that can be selected via a keyboard. The minimum validity of a fee schedule table allocated to a carrier identification number CIN is stored and interpreted by the postage meter machine in order, when needed, to form request data for loading new fee schedule table data, or for updating in the memory of the scale according to the CIN.

U.S. Pat. No. 5,448,641 discloses a postal fee system wherein a validity check is made in the terminal equipment at the user side. The postage fee schedule table is transmitted from the data center to the terminal equipment. A code belonging to the postage fee schedule is also transmitted from the data center to the terminal equipment. The latter generates a comparison code from information based on the received postage fee schedule table. On the basis of the comparison of the received code to the generated comparison code, the validity of the received postage fee schedule table can be checked in the terminal equipment. Although the terminal equipment can verify the communicated postage fee schedule table, the data center cannot check whether the current postage fee schedule table was in fact properly stored by the terminal equipment. In case of disagreement, the user could delay payment of the service or refuse it because no documentation exists about the storage of the postage fee schedule table that ensued in the terminal equipment. The manufacturer of the postage meter machine thus count not avoid an on site inspection of the machine.

SUMMARY OF THE INVENTION

An object of the present invention is to provide an arrangement and a method for the dependable transmission of service data to a terminal equipment which allows for proper storage of service data to be checked, particularly a communicated postage fee schedule table, which avoids the aforementioned shortcomings of the prior art. The check should ensue automatically, preferably without input on the part of the user of the terminal equipment. The terminal equipment should not be blocked (unavailable for use) for an unnecessarily long time.

The invention responds to the need of some mail carriers to freely modify service data, particularly the fees in postage fee schedule tables. The service data are required to be stored in a processing module at the terminal equipment.

The processing module is an electronic postage computer. The terminal equipment is connected to a postage computer, or the terminal equipment can contain a microprocessor serving as a postage computer, the postage computer being programmed to undertake a storage of the new postage fee schedule table data in a memory of the terminal equipment or of the postage computer, and to form a checksum over the stored, new postage fee schedule table data and to communicate the checksum to the data central, as well as to implement a received (OK) message and switch the terminal equipment or the postage computer into an operating mode.

Alternatively, the microprocessor of the terminal equipment or of the postage computer can be programmed to undertake an intermediate storage of the new postage fee schedule table data in volatile main memory of the terminal equipment or of the postage computer, and to form a checksum over the intermediately stored, new postage fee schedule table data and communicate the checksum to the data center, as well as to implement a load instruction of the data center at the terminal equipment upon reception of an OK message, so as to load the new postage fee schedule table data into a non-volatile memory of the postage computer and to subsequently switch the terminal equipment or the postage computer into an operating mode.

When service data are required, particularly a modified postage fee schedule table in an electronic postage computer, accordingly, a remote loading procedure can ensue. Carriers (governmental or commercial) respectively commission (approve) a data center to offer the service of remote loading, i.e., to communicate service data to the terminal equipment on demand in order to be able to load the service data into corresponding memories of the terminal equipment's processing module. In such a remote loading procedure, the inventive method for reliable transmission of service data to a terminal equipment is utilized with the following method steps:

- offering new service data in the data center for a future processing based on the service data;
- forming request data for service data at the terminal equipment;
- conducting a first communication between the terminal equipment and a data center wherein the terminal equipment transmits the request data in order to request the new service data from the data center and wherein the request data are received in the data center and the data center transmits the requested service data to the terminal equipment the received requested data then being intermediately stored at the terminal equipment;
- conducting a second communication between the terminal equipment and the data center, wherein the terminal equipment formulates a message that refers to the content of the intermediately stored, valid, new service data and transmits this message to the data center, and wherein the data center receives and checks the message on the basis of a comparison with information generated from the service data and, wherein the data center transmits a message to the terminal equipment, with a registration of the service performed ensuing in the data center in conjunction with the transmission of this message.

The communication from the data center can ensue by modem directly with the processing module in the terminal equipment or indirectly with the processing module via the terminal equipment.

The initially volatilely intermediately stored, valid, new service data are processed by the processing module to form a checksum. A message is then formed and is communicated from the terminal equipment to the data center. The message communicated to the data center preferably contains an identification of the terminal equipment (for example, a PIN), a version number and the checksum over the service data or an encrypted checksum, or a signature. The new service data (intermediately) stored in the processing module or terminal equipment thus can be identified in the data center and their proper or error-free (intermediate) storage can be verified. The terminating message sent by the data center is, for example, a load instruction to load the new surface data into a non-volatile memory of a processing module.

The postage computer can be integrated in the terminal equipment or can be arranged separate from the terminal equipment. The terminal equipment is preferably a postage meter machine, with a symmetrical encryption algorithm for forming an encrypted checksum and a secret key being stored in secure form in the postage meter machine.

Alternatively, the postage computer can be integrated in a scale. In this case an asymmetrical encryption algorithm for forming an encrypted checksum and a public key are stored in the scale, with the public key being stored in an unsecured manner.

DESCRIPTION OF THE PREFERRED EMBODIMENTS

Figure 1A:
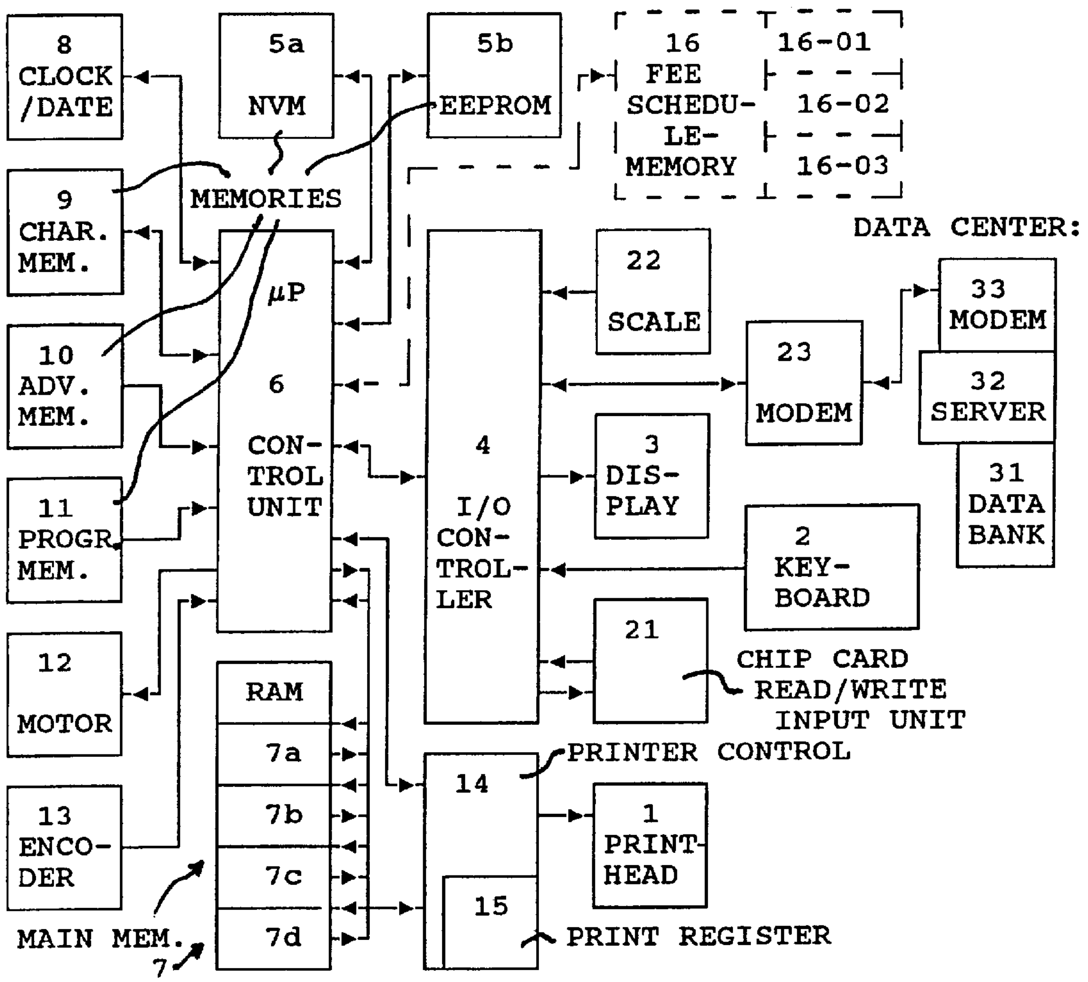
FIG. 1*a* is a block circuit diagram of a postage meter machine with postage computer constructed and operating in accordance with the invention.

FIG. 1*a* shows a block circuit diagram of the inventive postage meter machine with a printer module 1 for a completely electronically generated franking image. This postage meter machine has at least one input unit 2 with a number of actuation elements, a display unit 3, a modem 23 that produces the communication with a data center. A further input unit 21 and/or a scale 22 is/are coupled to a control unit 6 via an input/output control module 4. The postage meter machine has non-volatile memories 5*a*, 5*b*, 9, 10 and 11 for data that contain the variable or the constant parts of the franking image and programs for processing the data in conjunction with the mail carrier and service to be carried out by the carrier (as explained below).

Further explanations about individual functions of the aforementioned components are provided in German OS 19534530, corresponding to U.S. Pat. No. 5,805,711. A character memory 9 supplies the necessary print data for the variable parts of the franking image to a volatile main memory 7. The control unit 6 is a microprocessor μP that is in communication with the input/output control module 4, the character memory 9, the volatile main memory 7 and non-volatile main memories 5*a*, 5*b* containing internal, non-volatile fee schedule memories. Alternatively, (shown in broken lines) an additional, non-volatile fee schedule memory 16 can be used. The control unit 6 is also in communication with a non-volatile advertising slogan/graphics memory 10 and program memory 11, with the motor of a transport or feeder means, possibly with a tape dispenser 12, an encoder (coding disk) 13, as well as a clock/date module 8. That memory module that includes the non-volatile main memory 5*b* can, for example, be an EEPROM that is protected against removal by at least one additional measure, for example gluing on the printed circuit board, sealing or casting with epoxy resin. The storage of the postage fee schedule tables can be realized separately or, for example, within the non-volatile memory 5*a* by providing special memory areas. The individual memories can be realized as a number of physically separated modules or can be combined in a few modules. A fee schedule table which will become valid in the future is stored in the memory area 16-01 provided therefor and the current valid fee schedule table is stored in the separately provided memory area 16-02. The available memory capacity in the non-volatile memory amounts, for example, to 20 kBytes and is optimally utilized on the basis of space-saving memory space management. The non-volatile fee schedule memory is preferably a battery supported CMOS-RAM module. In a preferred version of the embodiment, it includes a third memory area 16-03 in which the checksum formed for the respectively desired postage fee schedule table is stored allocated to a version number.

Obtaining the postage fee schedule table data from the data center ensues as needed or in conjunction with the remote loading of the postage meter machine with a credit (postage call for the purpose of re-crediting), with the security measures of the credit loading being utilized also for the table loading. The postage fee schedule table data are initially intermediately stored in the memory area 70 of the volatile main memory RAM 7 of the postage meter machine. The microprocessor 6 can now form a checksum over the content of the postage fee schedule table data and send this checksum by modem 23 to the data center DZ land-line or radio via a communication network. The data center DZ has a modem 33 that is connected to a server 32 that accesses a data bank 31. The requesting postage meter machine identifies itself at the data center with its PIN (postage call identification number) and communicates the version number for the purpose of locating a new postage fee schedule table in the data bank DB31 of the data center, wherein a postage fee schedule table is allocated to the communicated version number. The server 32 is programmed for checking the proper transmission and error-free intermediate storage of service data on the basis of the checksum, as will be explained in yet greater detail with reference to FIGS. 3*a* and 3*b*.

Figure 1B:
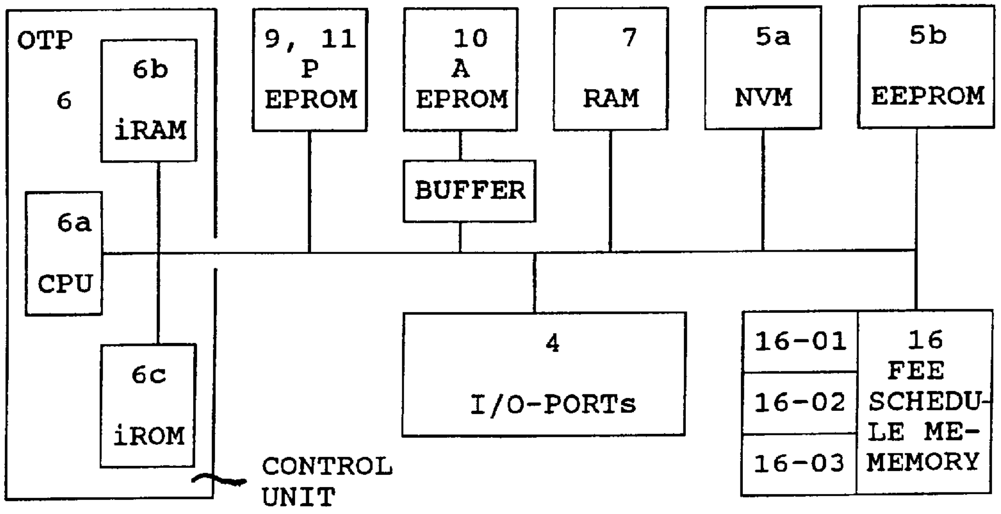
FIG. 1*b* is a block circuit diagram of a version of the postage meter machine of FIG. 1*a* having an OTP.

Details of the block circuit diagram of the electronic postage meter machine for a version with an OTP (one time programmable) processor as the control unit 6 are shown in FIG. 1*b*, as disclosed in the aforementioned German OS 19534530, as well as in German Patent Application 19731304.3-53, corresponding to U.S. application Ser. No. 09/115,048 filed Jul. 14, 1998. The CPU 6*a* forms the checksum on the basis of the communicated table that has been volatilely intermediately stored. The intermediate storage of the communicated table can, for example, also ensue in the internal main memory iRAM 6*b* instead of in the volatile main memory RAM 7 or using both main memories.

Figure 1C:
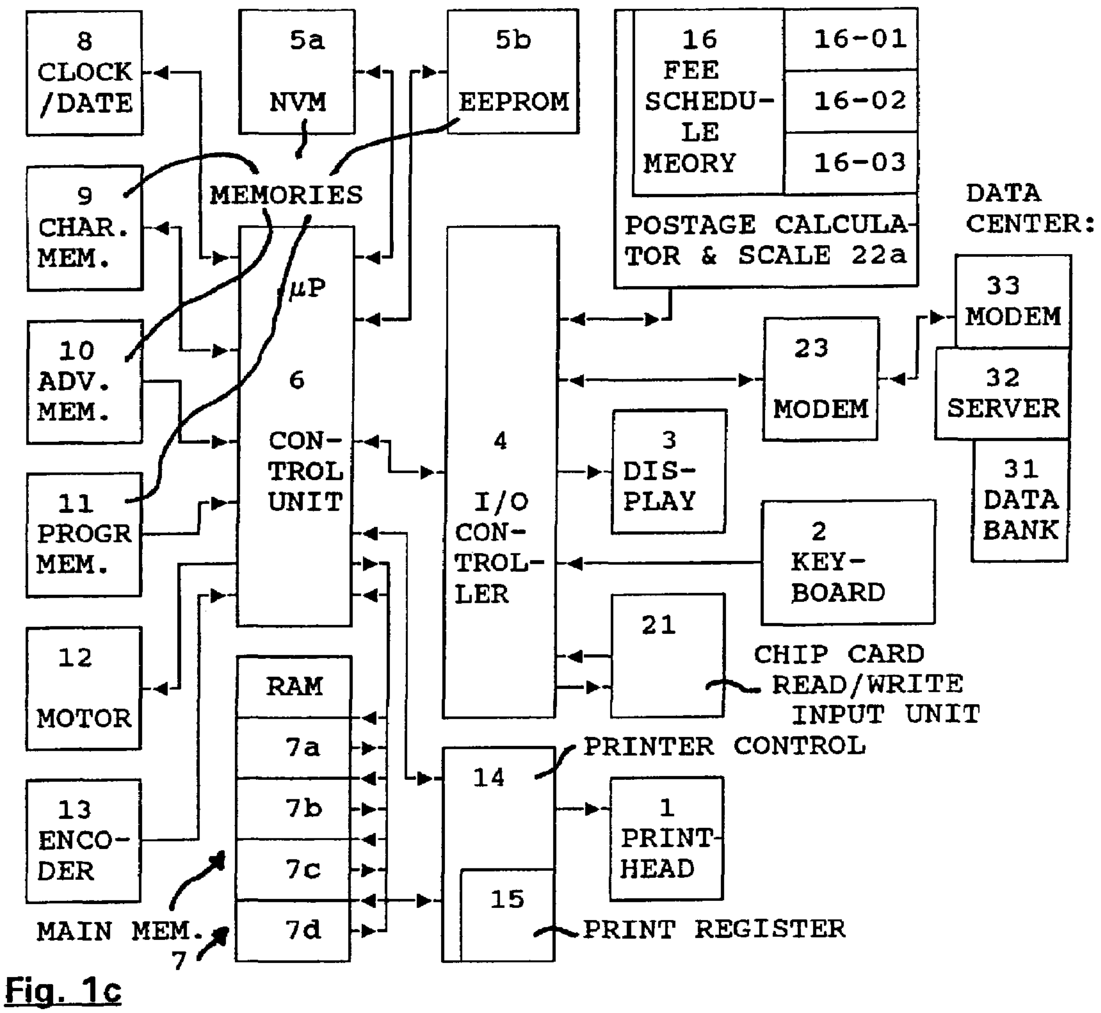
FIG. 1*c* is a block circuit diagram of a postage meter machine with a postage-calculating scale.

FIG. 1*c* shows a block circuit diagram of the electronic postage meter machine for a version with a postage-calculating scale. The fee schedule memory 16 and the postage computer are components of the postage-calculating scale 22*a* here. The latter utilizes the modem 23 of the postage meter machine for communication with the data center DZ.

When a modified postage fee schedule table is required in an electronic postage computer, a remote installation can ensue on demand. A postage fee schedule table is to be communicated to the terminal equipment on demand in order to be able to load this into corresponding memories of the postage computer. Given such a remote installation, one embodiment of the inventive method for dependable transmission of service data to a terminal equipment proceeds according to the following method steps:

In step 210, new postage fee schedule table data are offered in the data center for a future postage calculation. In step 110 the terminal equipment (postage calculator) formulates request data for postage fee schedule table data. In a first communication 120 of the terminal equipment with the data center, the request data are transmitted in order to request the new postage fee schedule table data from the data center, and comprising a reception and storing of the requested postage fee schedule table data are subsequently received and stored by the terminal equipment. In a first communication 220 of the data center with the terminal equipment, the aforementioned request data are received at the data center and the requested postage fee schedule table data are transmitted to the terminal equipment. In a second communication 130 of the terminal equipment with the data center, a message is formed at the terminal equipment and is communicated to the data center, that refers to the stored, valid, new postage fee schedule table data. In a second communication 230 of the data center with the terminal equipment, the aforementioned message is received by and checked in the data center by comparison information generated from the postage fee schedule table data, and an OK message is transmitted to the terminal equipment, and in step 240 a registration of the service performed ensues in the data center in conjunction with the transmission of an OK message.

Upon reception of the OK message in the terminal equipment, an indicator that the stored data is registered in valid form ensues and a flag for payment of the service ensues in the data center. As the indicator, either a bit is set in a secured area in the non-volatile memory of the postage computer or corresponding MAC-protected data are stored. The microprocessor only utilizes data registered as valid for calculating postage.

The following method steps proceed in an alternative embodiment:

In step 210, new postage fee schedule table data are offered in the data center for a future postage calculation. In step 110 the terminal equipment (postage calculator) formulates request data for postage fee schedule table data. In a first communication 120 of the terminal equipment with the data center, the request data are transmitted in order to request the new postage fee schedule table data from the data center, and comprising a reception and storing of the requested postage fee schedule table data are subsequently received and stored by the terminal equipment. In a first communication 220 of the data center with the terminal equipment, the aforementioned request data re received at the data center and the requested postage fee schedule table data are transmitted to the terminal equipment. In a second communication 130 of the terminal equipment with the data center, a message is formed at the terminal equipment and is communicated to the data center, that refers to the stored, valid, new postage fee schedule table data. In a second communication 230 of the data center with the terminal equipment, the aforementioned message is received by and checked in the data center by comparison information generated from the postage fee schedule table data, and an OK message is transmitted to the terminal equipment, and in step 240 a registration of the service performed ensues in the data center in conjunction with the transmission of an OK message.

In a second communication 230 of the data center with the terminal equipment, the aforementioned message is received by and checked in the data center by comparison information generated from the postage fee schedule table data, and a load instruction is transmitted to the terminal equipment to load the new postage fee schedule table data into a non-volatile memory of its postage computer.

A registration (step 240) of the loading ensues in the data center, and loading (step 140) of the postage fee schedule table data into a non-volatile memory of the postage computer ensues after reception of the load instruction.

Advantageously, the communication from the data center can ensue by modem directly with the postage meter machine or postage-calculating scale or can ensue indirectly to the postage-calculating scale via the postage meter machine, as disclosed in U.S. Pat. Nos. 5,606,508 and 5,710,706.

According to U.S. Pat. No. 5,606,508, the postage computer is arranged inside the electronic postage meter machine and a scale is connected to the electronic postage meter machine only for communicating weight. Alternatively, as disclosed in U.S. Pat. No. 5,710,706, a postage-calculating scale is equipped with an electronic postage computer. The postage value thus already can be determined by the postage-calculating scale on the basis of the measured weight and can be supplied as an input to the postage meter machine. In these known arrangements, a non-volatile intermediate storage of the postage fee schedule table occurs, for example in a chip card or in the memory of a GSM network, the data tables being taken therefrom for loading.

Differing therefrom, a volatile intermediate storage of the communicated table in a volatile main memory of the terminal equipment or of the postage computer is initially adequate in the alternative embodiment of the inventive method. The terminal equipment is connected to a postage computer in which storage of the new postage fee schedule table data ensues.

The postage computer can be integrated in the terminal equipment or can be arranged separated from the terminal equipment. The intermediate storage ensues in the volatile main memory RAM 7 in order to form a checksum with the control unit (microprocessor) 6. The postage computer forms the checksum over the content of the table according to a known algorithm that is stored in the program memory 11. The information communicated to the data center preferably contains the version number and a checksum over the postage fee schedule table data in a predetermined mathematical operation, or contains an encrypted checksum, or a signature. Known symmetrical or asymmetrical algorithms are utilized for encryption.

In a second version of the arrangement an OTP processor is used which allows the formation of a DES-encrypted checksum, whereby the symmetrical DES (data encryption standard) algorithm and the secret DES key are stored in a secure manner in the postage meter machine. Alternatively, a checksum can be communicated from the separate postage computer to the postage meter machine, which has a secure housing with special measures to protect against tampering. The postage meter machine then forms a DES-encrypted checksum, with the DES key required for this purpose being stored in a secure manner in the postage meter machine in a known way.

In an other version the postage computer is integrated in a scale or is arranged separated from the terminal equipment. The postage computer contains a program memory having an asymmetrical encryption algorithm and having a public key. The latter, which need not be particularly protected in the manner of a secret key, can consequently likewise be non-volatilely stored in a memory of the scale.

The RSA algorithm (named for its inventors R. Rivest, A. Shamir, L. Adleman) is a suitable known asymmetrical encryption algorithm. This is advantageous when no secured housing is available for the protection of the keys. For example, an RSA-encrypted checksum is formed in the scale, with an RSA key being employed that is stored in the scale as a public key and thus such storage need not be secured.

Figure 2:
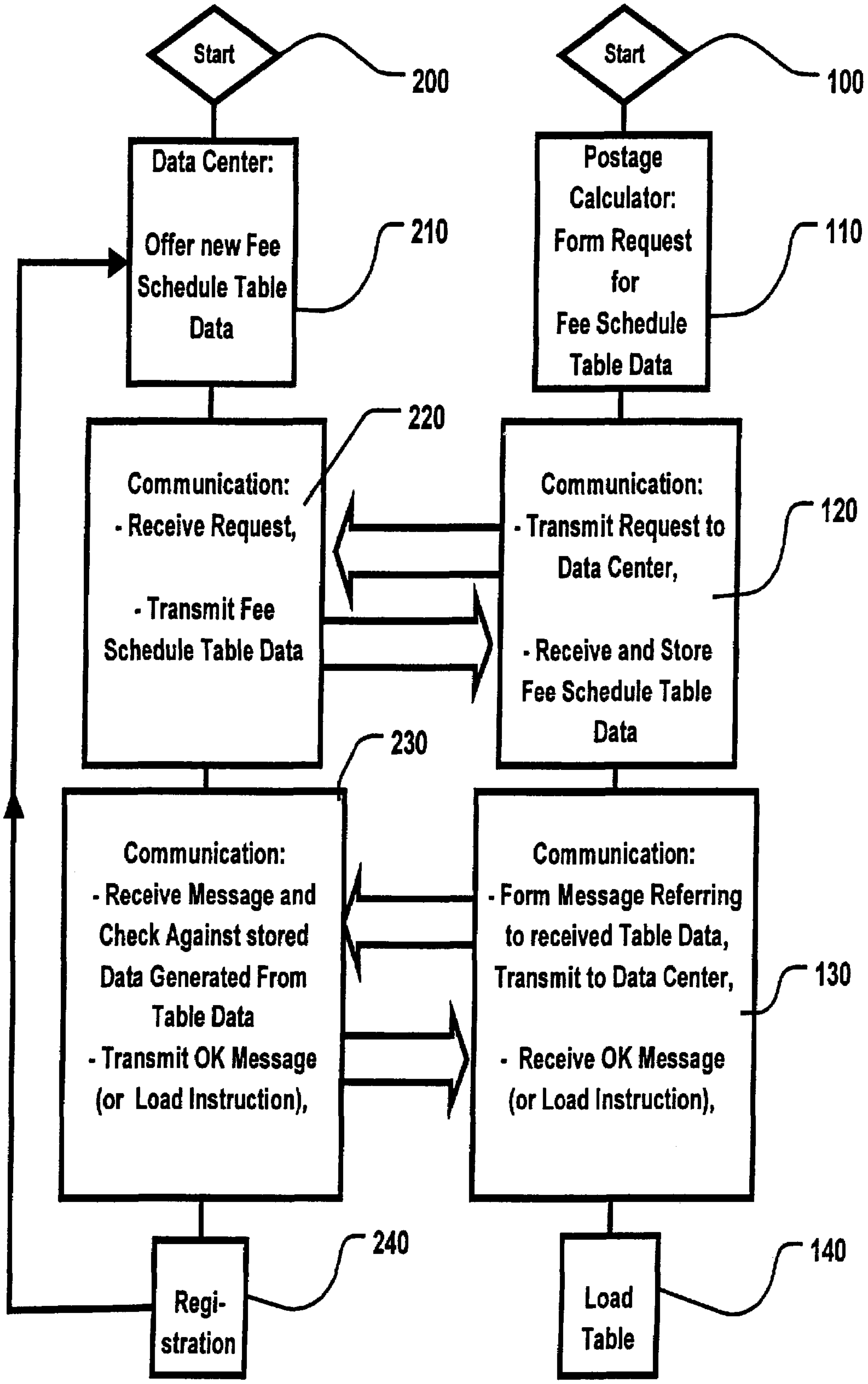
FIG. 2 is a flowchart for the dependable transmission of data in accordance with the invention.

FIG. 2 shows a flowchart for the dependable transmission of data to the terminal equipment in according with the inventive method. The data center starts in step 200 and offers new postage fee schedule tables in the following step 210. For example, the terminal equipment is a postage meter machine that is started when turned on (step 100). The postage meter machine contains a postage computer that, in step 110, forms request data for new postage fee schedule table data. In one version of the method an automatic unit forms request data in order to be able to access current tables when the point in time for new postage fee schedule table data comes close. This automatic unit works dependent on the carrier that has been set and on the date supplied to the postage meter machine by the clock/date module 8. The automatic unit can be realized in the postage computer and/or in the memory cells of the clock/date module 8. Alternatively, the postage computer can be integrated in a postage-calculating scale 22*a* that is connected by interface to the postage meter machine.

The communication between the terminal equipment, i.e. the postage meter machine, and the data center proceeds in two transactions. The first transaction 120 begins with a transmission of the request data in order to request the new postage fee schedule table data from the data center and ends with reception and intermediate storage of the requested postage fee schedule table data in a volatile main memory RAM 7*d*. Proceeding in parallel at the data center is a communication (step 220) of the data center with the terminal equipment, including a reception of the request data in the data center and transmission of the requested postage fee schedule table data to the terminal equipment, i.e. to the postage meter machine.

The second transaction 130 at the terminal equipment begins with formation of a message in the terminal equipment, i.e. in the postage meter machine, this message referring to the intermediately stored, valid, new postage fee schedule table data. The communication of the terminal equipment with a data center is continued with the communication of the message from the terminal equipment to the data center and reception of the OK message, and/or a load instruction. Proceeding in parallel at the data center is a second communication (step 230) of the data center with the terminal equipment, including reception and checking of the information in the data center on the basis of a comparison with information generated from the postage fee schedule table data, and transmission of an OK message and/or a load instruction to the terminal equipment to load the new postage fee schedule table data into a non-volatile memory of the postage computer. In step 140, the received OK message is implemented; loading of a new postage fee schedule table data ensues when a valid load instruction is received. Otherwise, the second communication is repeated if no OK message was received.

In parallel therewith, a registration (step 240) of the service in a data bank of the data center is undertaken at the data center for the purpose of billing and accounting or later payment. A branch is then made back to step 210.

In the preferred example with the postage computer in the electronic postage meter machine, the postage meter machine—in addition to sending its PIN—sends a version number and the checksum to the data center, making it possible for the data center to unambiguously identify the transmitted, new fee schedule table data. Before the fee schedule table data stored intermediately in the postage meter machine are recognized as valid, a check of the checksum is also implemented in the data center. The aforementioned message preferably contains the version number of the table and an encrypted checksum in order to enable a verification of the properly communicated and intermediately stored table. An encrypted checksum can be employed as a digital signature that refers to the volatilely intermediately stored, valid, new postage fee schedule table data, however, further data can enter into the message or can be encrypted therewith.

Figure 3A:
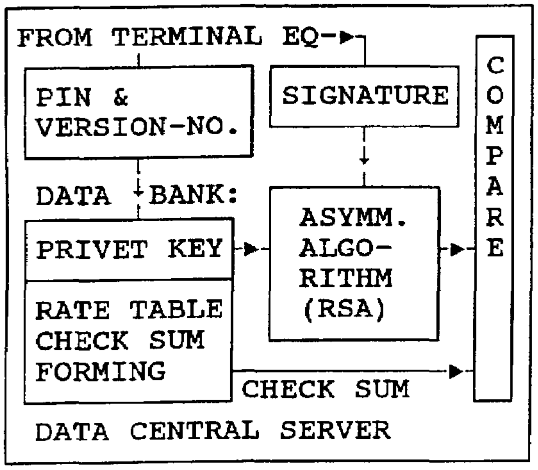
FIG. 3*a* is a flowchart for a first embodiment for checking the transmitted data in accordance with the invention.
Figure 3B:
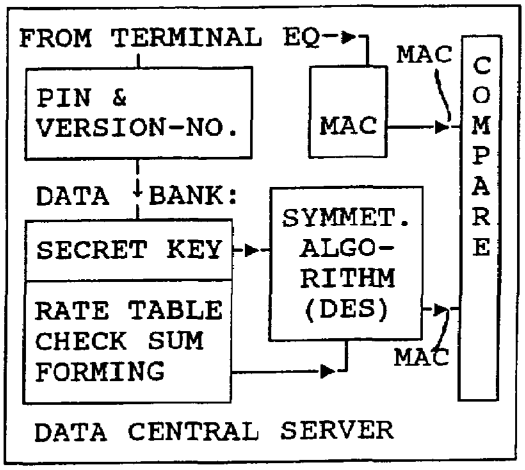
FIG. 3*b* is a flowchart for a second embodiment for checking the transmitted data in accordance with the invention.

FIGS. 3*a* and 3*b* show first and second versions of a flowchart for checking the dependable transmission of data to the terminal equipment.

In one version, shown in FIG. 3*a*, the encrypted checksum is formed by the postage computer on the basis of an asymmetrical encryption algorithm, a public key being stored therein, and an appertaining, private, secret key (PRIVATE KEY) is employed for checking in the data center, this being stored in a secure manner and being kept secret from third parties. Given an RSA signature, a message based on the version number and on the checksum is encrypted with a public write key (PUBLIC KEY) to form a digital signature. The digital signature (SIGNATURE) is sent from the terminal equipment to the data center together with the identification number PIN and the version number (VERSION NO), the data center being capable of decrypting the signature with a secret read key (PRIVATE KEY) according to the asymmetrical algorithm (RSA). The checksum (CHECK SUM) over the content of the fee schedule table data that are stored in the data bank 31 allocated to the version number (and possibly also allocated to the PIN) must agree with the decrypted message if the fee schedule table data intermediately stored in the postage computer or in the postage meter machine are to be recognized as being valid. This verification is a prerequisite in order to communicate a corresponding command to the postage meter machine. The rate table check sum formation can ensue before or during the communication. A prior formation has the advantage that the comparison check sum RATE TABLE CHECK SUM is stored in the data bank 31 allocated to the version number VERSION NO. or PIN and can be called directly from the data bank 31 by the server 32 for comparison. The calculating time of the server 32 that is saved is thus advantageously available to the decryption procedure of the SIGNATURE. The decrypted message is identical to the checksum CHECK SUM that was formed in the postage computer or terminal equipment from the volatilely intermediately stored postage fee schedule table. Given proper intermediate storage, the decrypted checksum CHECK SUM is identical to the comparison checksum RATE TABLE CHECK SUM that is formed or stored in the data bank 31.

The digital signature algorithm (DSA) according to U.S. Pat. No. 5,231,668 is also known for producing the RSA signature. Fundamentally, however, any other arbitrary asymmetrical algorithm can be utilized, for example the ELGamal algorithm (ELGA) or the elliptic curve signature scheme (ECSS).

In another version, shown in FIG. 3*b*, an encrypted checksum MAC (message authentication code) is formed with a symmetrical encryption algorithm, this being formed by the postage meter machine in which a secret key is stored. The encrypted checksum MAC is communicated to the data center. Differing from the version shown in FIG. 3*a*, no decryption is implemented in the data center; rather, an encryption is implemented in order to encrypt a checksum derived from the postage fee schedule table to form a comparison MAC'. The RATE TABLE CHECK SUM formation can ensue before or during the communication. Such a prior formation has the advantage that the CHECK SUM merely has to be called from the data bank 31 in order to generate the comparison MAC' from this CHECK SUM by encryption with a secret key SECRET KEY using a symmetrical algorithm DES with the assistance of the server 32.

The same secret key SECRET KEY is employed in the check in the data center as in the postage meter machine. The check in the data center preferably ensues with both MACs. A suitable version of the DES algorithm is preferably utilized in the MAC formation. The same secret DES key is employed given a MAC formation in the data center and in the postage meter machine. To that end, the secret DES key must be stored secured in the data bank 31 allocated to that PIN identifying the terminal equipment. Alternatively, the RATE TABLE CHECK SUM formation and the encryption to form a comparison MAC can ensue in common before the communication. The comparison MAC is then stored in the data bank 31 allocated to the PIN and to the version number and can be called by the server for comparison purposes.

Newer postage meter machines utilize digitally operating printing units. For example, the postage meter machines T1000 and JetMail of Francotyp-Postalia AG & Co. are the first to exhibit a thermo transfer printer and an ink jet printer, respectively. It is thus fundamentally possible to print different information or to arbitrary print in some other way on a filled envelope in the region of the franking stamp, this other information having a corresponding relationship to a service of a carrier. It is thus easily possible to change between private mail carriers and their services. The franking stamp imprint therefore advantageously contains a reference to the carrier and/or the service being used.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for dependably transmitting service data from a data center to remotely-located terminal equipment, comprising the steps of:

offering new service data at a data center for future use at terminal equipment;

forming a request for new service data at the terminal equipment;

establishing a first communication between the terminal equipment and the data center and in said first communication transmitting said request data from the terminal equipment to the data center, receiving the request data at the data center, transmitting the new service data requested in the request data from the data center to the terminal equipment, and receiving and storing the new service data at the terminal equipment; and establishing a second communication between the terminal equipment and the data center and in said second communication forming a message at the terminal equipment that refers to the new service data stored at the terminal equipment, communicating said message from the terminal equipment to the data center, receiving the message from the terminal equipment at the data center and checking the message at the data center by comparison of information contained in the message with information generated from the new service data at the data center and, given a positive comparison result, transmitting a follow-up message from the data center to the terminal equipment allowing said terminal equipment, when appropriate, to use said new service data, and registering at the data center the valid transmission of the new service data to the terminal equipment.

2. A method as claimed in claim 1 wherein said follow-up message comprises an OK message allowing the terminal equipment to be switched into an operating mode.

3. A method as claimed in claim 2 wherein the step of transmitting said OK message includes transmitting a marking in said OK message indicating that the new service data stored at the terminal equipment are valid.

4. A method as claimed in claim 1 wherein the step of storing the new service data in the first communication comprises intermediately storing the new service data at the terminal equipment, and wherein the step of transmitting said follow-up message in said second communication comprises transmitting a load instruction from the data center to the terminal equipment, and wherein said second communication includes the step of, upon receipt of said load instruction at the terminal equipment, loading the new service data into a non-volatile memory of a processing module at the terminal equipment.

5. A method as claimed in claim 1 wherein the step of forming said message in the second communication at the terminal equipment comprises forming a message including a version number associated with the new service data and a checksum.

6. A method as claimed in claim 1 wherein the step of forming said message in the second communication at the terminal equipment comprises forming a message including a version number associated with the new service data and an encrypted checksum.

7. A method as claimed in claim 1 wherein the step of offering said new service data comprises offering postage fee schedule table data as said new service data, and comprising the step of providing a postage computer having a processing module which makes use of said postage fee schedule table data at said terminal equipment.

8. A method as claimed in claim 7 wherein the step of forming said message in said second communication at said terminal equipment includes forming a message including a version number of the new service data and an encrypted checksum, and comprising the step of providing a postage meter machine at said terminal equipment in communication with said postage computer, storing a secret key in said postage meter machine, forming said encrypted checksum in said postage meter machine using a symmetrical encryption algorithm and said secret key, and storing said secret key as well at said data center and using said secret key at said data center to check said message from said terminal equipment in said second communication.

9. A method as claimed in claim 7 wherein the step of forming said message in said second communication at said terminal equipment comprises forming a message including a version number of the new service data and an encrypted checksum, and comprising the steps of storing a public key in said postage computer and forming said encrypted checksum in said postage computer using an asymmetrical encryption algorithm and said public key, and storing a non-public secret key, related to said public key, at said data center and using said non-public secret key at said data center to check said message in said second communication.

10. A method as claimed in claim 1 wherein the step of offering new service data at said data center comprises offering new postage fee schedule table data at said data center for future use in postage calculation, and wherein the step of checking the message transmitted from the terminal equipment to the data center in the second communication comprises checking information contained in said message by comparison with information generated from the new postage fee schedule table data, and wherein the step of transmitting said follow-up message in said second communication from said data center to the terminal equipment comprises transmitting an OK message indicating that the new postage fee schedule table data received at said terminal equipment are valid and also including a load instruction instructing the terminal equipment to load the new postage fee schedule table data into a non-volatile memory of a postage computer at said terminal equipment.

11. A method as claimed in claim 10 comprising the additional step of loading said new postage fee schedule table data into said non-volatile memory at said postage computer upon receipt at said terminal equipment of said follow-up message.

12. A method for dependably transmitting service data from a data center to remotely-located terminal equipment, comprising the steps of:

transmitting unencrypted service data from a data center to terminal equipment;

generating a code at the terminal equipment based on the transmitted service data;

transmitting said code from said terminal equipment to said data center; and receiving said code at said data center and checking said code at said data center and transmitting a message from said data center to said terminal equipment identifying a result of the check.

13. A method as claimed in claim 12 comprising providing a postage computer at said terminal equipment, and wherein the step of transmitting unencrypted service data to the terminal equipment comprises transmitting unencrypted fee schedule table data, as said unencrypted service data, to said postage computer, and comprising the steps of generating a checksum at said postage computer based on the transmitted fee schedule table data and transmitting the checksum to the data center as at least a part of said code, and wherein the step of checking the code at the data center comprises checking the checksum at the data center on the basis of a stored checksum stored at said data center and wherein the step of transmitting a message to the terminal equipment comprises transmitting an OK message to the terminal equipment given coincidence of said stored checksum with the checksum transmitted to the data center.

14. A method as claimed in claim 12 comprising providing a postage computer at said terminal equipment, and wherein the step of transmitting unencrypted service data to the terminal equipment comprises transmitting unencrypted fee schedule table data, as said unencrypted service data, to said postage computer, and comprising the steps of generating a encrypted code at said postage computer based on the transmitted fee schedule table data and transmitting the encrypted code to the data center as at least a part of said code, and wherein the step of checking the code at the data center comprises checking the encrypted code at the data center on the basis of a stored encrypted code stored at said data center and wherein the step of transmitting a message to the terminal equipment comprises transmitting an OK message to the terminal equipment given coincidence of said stored encrypted code with the encrypted code transmitted to the data center.

15. A method as claimed in claim 12 comprising providing a postage computer at said terminal equipment and wherein the step of transmitting unencrypted service data to the terminal equipment comprises transmitting unencrypted fee schedule table data, as said unencrypted service data, to said postage computer, and wherein the step of generating a code at the terminal equipment comprises generating a signature representing information dependent on the transmitted fee schedule table data and encrypting said information with a public write key to form said signature, and wherein the step of transmitting said code to the data center comprises transmitting said signature to the data center, and wherein the step of checking the code at the data center comprises decrypting the signature at the data center with a secret read key according to an asymmetrical algorithm and checking the information in the signature with information stored at the data center and, given a positive comparison result, transmitting an OK message to the terminal equipment.

16. A method as claimed in claim 15 comprising the step of forming a checksum as said information contained in said signature.

17. An arrangement for dependably transmitting service data from a data center to remotely-located terminal equipment, comprising:

a data center, and terminal equipment located remote from said data center, said data center offering new service data for future use at said terminal equipment;

means for forming a request for new service data at the terminal equipment;

means for establishing a first communication between the terminal equipment and the data center and in said first communication transmitting said request data from the terminal equipment to the data center, means for receiving the request data at the data center and for transmitting the new service data requested in the request data from the data center to the terminal equipment, and means for receiving and storing the new service data at the terminal equipment; and means for establishing a second communication between the terminal equipment and the data center and in said second communication forming a message at the terminal equipment that refers to the new service data stored at the terminal equipment and for communicating said message from the terminal equipment to the data center, means for receiving the message from the terminal equipment at the data center and for checking the message at the data center by comparing information contained in the message with information generated from the new service data at the data center and, given a positive comparison result, for forming and transmitting a follow-up message from the data center to the terminal equipment allowing said terminal equipment, when appropriate, to use said new service data, and means for registering at the data center the valid transmission of the new service data to the terminal equipment.

18. An arrangement as claimed in claim 17 wherein said means for forming said follow-up message comprises means for forming an OK message allowing the terminal equipment to be switched into an operating mode.

19. An arrangement as claimed in claim 18 wherein said means for forming said OK message means for including a marking in said OK message indicating that the new service data stored at the terminal equipment are valid.

20. An arrangement as claimed in claim 17 wherein said means for storing the new service data in the first communication comprise means for intermediately storing the new service data at the terminal equipment, and wherein said means for transmitting said follow-up message in said second communication comprise means for transmitting a load instruction from the data center to the terminal equipment, and wherein said terminal equipment comprises means for, upon receipt of said load instruction at the terminal equipment, loading the new service data into a non-volatile memory of a processing module at the terminal equipment.

21. An arrangement as claimed in claim 17 wherein said means for forming said message in the second communication at the terminal equipment comprise means for forming a message including a version number associated with the new service data and a checksum.

22. An arrangement as claimed in claim 17 wherein said means for forming said message in the second communication at the terminal equipment comprise means for forming a message including a version number associated with the new service data and an encrypted checksum.

23. An arrangement as claimed in claim 17 wherein said data center comprises means for offering postage fee schedule table data as said new service data, and wherein said terminal equipment comprises a postage computer having a processing module which makes use of said postage fee schedule table data.

24. An arrangement as claimed in claim 23 wherein said means for forming said message in said second communication at said terminal equipment comprise means for forming a message including a version number of the new service data and an encrypted checksum, and wherein said terminal equipment comprises a postage meter machine in communication with said postage computer, means for storing a secret key in said postage meter machine, means for forming said encrypted checksum in said postage meter machine using a symmetrical encryption algorithm and said secret key, and wherein said data center comprises means for storing said secret key as well at said data center and wherein said means for checking comprise means for using said secret key to check said message from said terminal equipment in said second communication.

25. An arrangement as claimed in claim 23 wherein said means for forming said message in said second communication at said terminal equipment comprise means for forming a message including a version number of the new service data and an encrypted checksum, and wherein said postage computer comprises means for storing a public key and for forming said encrypted checksum using an asymmetrical encryption algorithm and said public key, and wherein said data center comprises means for storing a non-public secret key, related to said public key, at said data center and wherein said means for checking comprise means for using said non-public secret key to check said message in said second communication.

26. An arrangement as claimed in claim 17 wherein said data center comprises means for offering new postage fee schedule table data at said data center for future use in postage calculation, and wherein said means for checking the message transmitted from the terminal equipment to the data center in the second communication comprises means for checking information contained in said message by comparison with information generated from the new postage fee schedule table data, and wherein said means for transmitting said follow-up message in said second communication from said data center to the terminal equipment comprises means for transmitting an OK message indicating that the new postage fee schedule table data received at said terminal equipment are valid and also including a load instruction instructing the terminal equipment to load the new postage fee schedule table data into a non-volatile memory of a postage computer at said terminal equipment.

27. An arrangement as claimed in claim 26 wherein said terminal equipment comprises loading said new postage fee schedule table data into said non-volatile memory at said postage computer upon receipt at said terminal equipment of said follow-up message.

28. An arrangement for dependably transmitting service data from a data center to remotely-located terminal equipment, comprising:

a data center, and terminal equipment located remote from said data center;

means for transmitting unencrypted service data from the data center to the terminal equipment;

means for generating a code at the terminal equipment based on the transmitted service data;

means for transmitting said code from said terminal equipment to said data center; and means for receiving said code at said data center and for checking said code at said data center and for transmitting a message from said data center to said terminal equipment identifying a result of the check.

29. An arrangement as claimed in claim 28 wherein said terminal equipment comprises a postage computer, and wherein said means for transmitting unencrypted service data to the terminal equipment comprises means for transmitting unencrypted fee schedule table data, as said unencrypted service data, to said postage computer, and wherein said postage computer comprises means for generating a checksum based on the transmitted fee schedule table data and wherein said means for transmitting said code comprise means for transmitting the checksum to the data center as at least a part of said code, and said means for checking the code at the data center comprise means for checking the checksum at the data center on the basis of a stored checksum stored at said data center and for transmitting a message to the terminal equipment comprising an OK message to the terminal equipment given coincidence of said stored checksum with the checksum transmitted to the data center.

30. An arrangement as claimed in claim 28 wherein said terminal equipment comprises a postage computer, and said means for transmitting unencrypted service data to the terminal equipment comprises means for transmitting unencrypted fee schedule table data, as said unencrypted service data, to said postage computer, and wherein said postage computer comprises means for generating a encrypted code based on the transmitted fee schedule table data and wherein said means for transmitting said code comprise means for transmitting the encrypted code to the data center as at least a part of said code, and wherein said means for checking the code at the data center comprise means for checking the encrypted code at the data center on the basis of a stored encrypted code stored at said data center and for transmitting a message to the terminal equipment comprising an OK message to the terminal equipment given coincidence of said stored encrypted code with the encrypted code transmitted to the data center.

31. An arrangement as claimed in claim 28 wherein said terminal equipment comprises a postage computer and wherein said means for transmitting unencrypted service data to the terminal equipment comprise means for transmitting unencrypted fee schedule table data, as said unencrypted service data, to said postage computer, and wherein said postage computer comprises said means for generating a code at the terminal equipment, said postage computer generating a signature, as said code, representing information dependent on the transmitted fee schedule table data and encrypting said information with a public write key to form said signature, and wherein said means for transmitting said code to the data center comprises means for transmitting said signature to the data center, and said means for checking the code at the data center comprise means for decrypting the signature at the data center with a secret read key according to an asymmetrical algorithm and for checking the information in the signature with information stored at the data center and, given a positive comparison result, for transmitting an OK message to the terminal equipment.

32. An arrangement as claimed in claim 31 wherein said postage computer comprises forming a checksum as said information contained in said signature.

* * * * *